(No Model.) 3 Sheets—Sheet 1.

J. S. COPELAND.
BRAKE MECHANISM.

No. 528,854. Patented Nov. 6, 1894.

Witnesses:
F. M. Eggleston.
M. Gibson.

Inventor:
James S. Copeland
By Redding & Kiddle
Attys.

(No Model.)  3 Sheets—Sheet 2.
J. S. COPELAND.
BRAKE MECHANISM.
No. 528,854.  Patented Nov. 6, 1894.
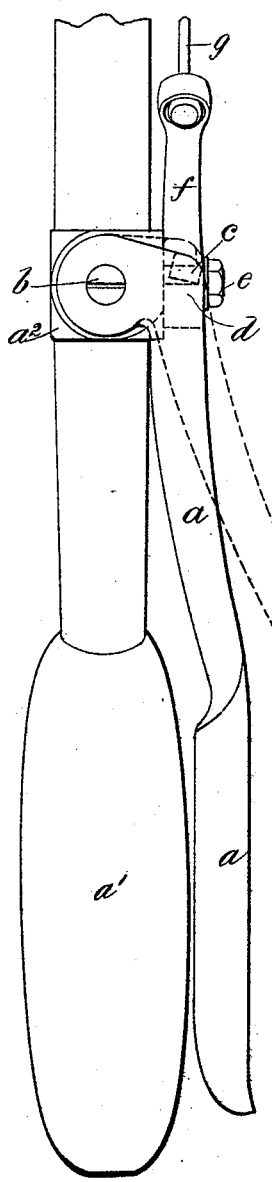
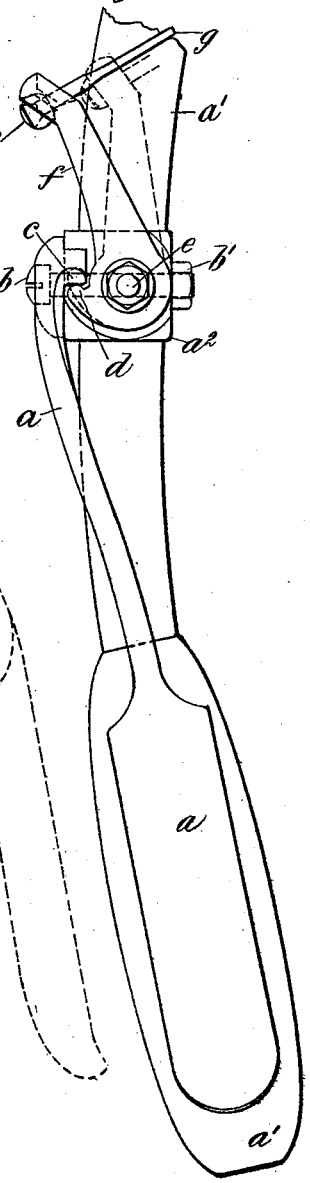

(No Model.)　　　　　J. S. COPELAND.　　　3 Sheets—Sheet 3.
BRAKE MECHANISM.

No. 528,854.　　　　　　　　Patented Nov. 6, 1894.

Witnesses:
F. M. Eggleston
M. Gibson

Inventor:
James S. Copeland
By Redding & Kiddle
Attys.

UNITED STATES PATENT OFFICE.

JAMES S. COPELAND, OF HARTFORD, CONNECTICUT, ASSIGNOR TO THE POPE MANUFACTURING COMPANY, OF SAME PLACE AND PORTLAND, MAINE.

BRAKE MECHANISM.

SPECIFICATION forming part of Letters Patent No. 528,854, dated November 6, 1894.

Application filed April 28, 1894. Serial No. 509,300. (No model.)

*To all whom it may concern:*

Be it known that I, JAMES S. COPELAND, a citizen of the United States, and a resident of the city and county of Hartford, State of Connecticut, have invented certain new and useful Improvements in Brake Mechanism, of which the following is a specification, reference being had to the accompanying drawings, forming part hereof.

This invention relates to brake mechanism, and the means embodying this invention are especially designed for use upon bicycles and like foot-driven vehicles.

This invention has for its objects simplicity of construction, lightness of weight, compactness, detachability of parts and other points of advantage as will be hereinafter explained.

In a brake mechanism embodying my invention, the brake is manipulated by a brake lever adapted to be operated by hand and this brake lever is suitably pivoted upon the handle bar so that its operating end will be in proximity to the end of the handle bar of the vehicle, and means are provided for transferring the motion of this brake lever to another lever also pivoted upon the handle bar which oscillates in a plane at an angle to the plane of movement of the brake lever and the lever thus operated by the brake lever is connected by suitable intervening rods and levers to the brake. The brake is mounted upon a detachable plate constructed so as to be highly effective in holding the brake in desired position and resisting the strains to which the brake is subjected.

Figure 1:
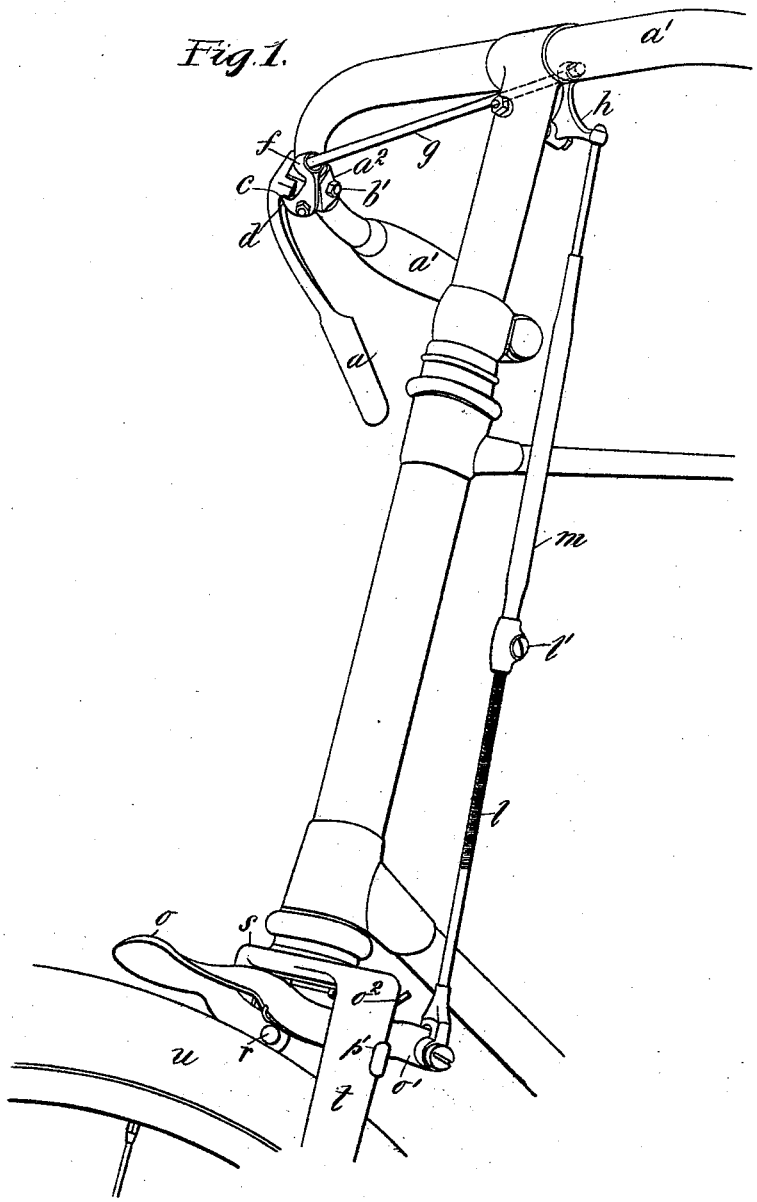
Figure 4:
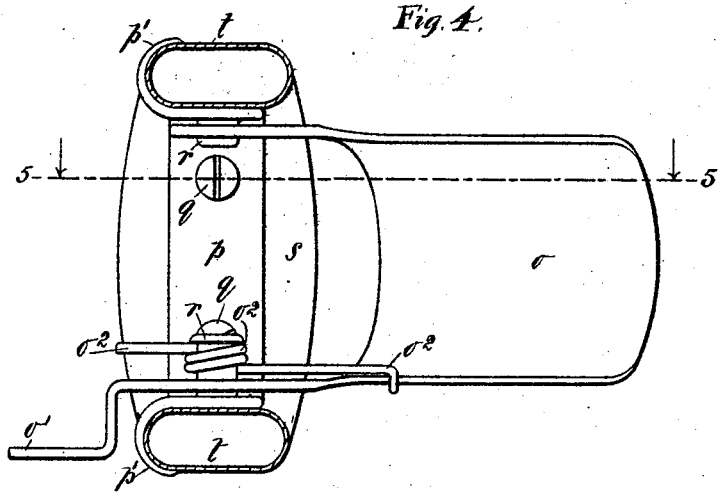
Figure 5:
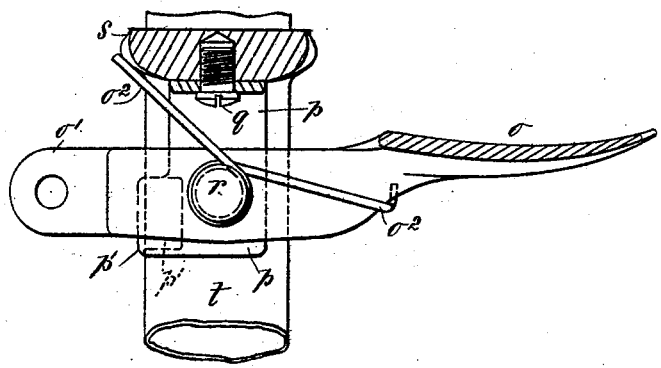

In the accompanying drawings Figure 1 is a perspective view showing portions of the frame, the handle bar and post and the front fork and wheel of a bicycle, with brake mechanism embodying my invention applied thereto. Fig. 2 is an elevation and Fig. 3 an underneath view of a portion of the handle bar and attached brake mechanism. Fig. 4 is an underneath plan view looking toward the crown of the fork with the fork legs in section and showing the brake and its supporting plate. Fig. 5 is a detail section taken on the line 5—5 of Fig. 4.

In the mechanism shown embodying my invention the handle lever or brake operating lever $a$ has its handle end located under the handle bar $a'$ and is pivoted so that it will oscillate in an approximately vertical plane its pivot pin $b$ passing through a short angular extension or offset at the inner end of the handle lever which offset constitutes the lug for the pivot pin, and this inner end of the handle lever is provided with a projection or cam $c$ which engages with the second lever or bell crank lever as will hereinafter be described. The pivot pin $b$ passes in an approximately horizontal direction through the handle bar $a'$ and through a sleeve $a^2$ driven upon the handle bar and has a nut $b'$ on its rear end clamping against the face of the sleeve $a^2$. By this construction the handle of the lever is in convenient position for manipulation while the lever itself is largely concealed beneath the handle bar and has no parts projecting above the handle bar, and the handle lever $a$ engages with and operates the bell lever at a point beneath and close to the lower surface of the handle bar and all parts are quite close to the handle bar and of very light weight.

The brake lever $a$ engages with an intermediate or bell-crank lever $f$ through the cam or lug $c$ which engages with a cam or bill $d$ on the short arm of the bell-crank $f$. This bell-crank lever is pivoted on the vertical pin $e$, passing through the sleeve $a^2$ or otherwise arranged so that said bell-crank lever is pivoted upon the handle bar, in proximity to the pivotal point of the brake lever $a$ and which pin $e$ allows the bell-crank to oscillate in an approximately horizontal plane. The brake lever $a$ and bell-crank lever $f$ are shown pivoted so as to move in planes at right angles to each other, but it is of course evident that the invention would be embodied if this angle were varied.

It is also evident that the levers may be pivoted upon pivot pins otherwise secured and held than those above described and shown in the drawings or may be otherwise pivoted in equivalent manner.

The long arm of the bell-crank lever $f$ suitably holds the end of the upper connecting rod $g$, as by a socket at the end of said lever $f$ within which is held the enlarged end of the connecting rod $g$, and this rod $g$ is connected at its other end to the bell-crank lever $h$, and the bell-crank lever $h$ is connected by the adjustable rod $l$, $m$, to the arm $o'$ of the brake $o$. The part $m$ of this lower connecting rod is preferably tubular and receives the part $l$ which is shown as externally threaded, and a clamping screw $l'$ holds the parts in desired adjustment.

The oscillating movement of the brake lever $a$ causes an oscillating movement of the bell-crank lever $f$ and a longitudinal movement of the upper connecting rod $g$ and an oscillating movement of the bell-crank lever $h$ and a longitudinal movement of the lower connecting rod $l$, $m$. The full lines in Figs. 2 and 3 show the position of these parts when the brake lever has been pulled up close to the handle bar and thereby the brake $o$ has been applied to the wheel $u$, while the dotted lines in Figs. 2 and 3 show the normal position of the parts with the brake off, and this normal position of the parts is also shown in Fig. 1. The lug on the brake lever and the bill on the bell lever are kept in engagement by means of a suitable tension device such as the spring $o^2$ (see Figs. 4 and 5) acting upon the brake $o$ and tending to hold it away from the wheel and also holding the lug $c$ and bill $d$ in contact, or a spring connecting any of the levers or rods with a rigid part of the frame, or otherwise acting upon or interposed between parts of the connections, may be employed.

It will be seen that in the construction above described of the brake connections, the operation of applying the brake to the wheel, in which operation the parts are subjected to heavy strains, imparts a pull or tension to the connecting rods, and that the only operation that imparts a thrust to the connecting rods is that resulting from the comparatively light reaction of the spring $o^2$ in moving the brake and connections back to normal position. It is therefore evident that these connecting rods may be exceedingly light and yet possess ample strength for their work of applying the brake.

It will also be noted that as both the operating lever $a$ and the second lever $f$ are pivoted upon the handle bar at points in proximity to each other, these operating levers may be short and of small dimensions and light weight, while the connecting rod $g$ which extends from the lever $f$ to about the middle of the handle bar, which rod $g$ is subjected only to a longitudinal pull in applying the brake, may be of exceedingly light weight.

It is also to be observed that all of the connecting devices are arranged quite close to the handle bar and frame and therefore this construction is not only neat and compact but is free from the objectionable feature of protruding parts that interfere with the movements of the rider of a bicycle and are otherwise undesirable.

The means for securing and holding the brake in place upon the frame are shown particularly in Figs. 4 and 5. The brake $o$ is somewhat spoon-shaped and with rounded outlines so that it will have a large bearing surface upon the tire and will not present any sharp corners or angles thereto, and is pivotally mounted upon the pins or studs $r$, $r$, projecting from the trough-shaped bracket $p$. This bracket $p$ fits against the under side of the fork crown $s$ and against the upper ends of the fork legs $t$, $t$, and has two hooked fingers $p'$, $p'$, which curve around the rear sides of the fork legs. It is held in place against the fork crown by the screws $q$, $q$, or other suitable and preferably detachable fastening devices.

When the brake is applied, the wheel tends to pull it forward with considerable force but this tendency is directly resisted by the fingers $p'$, $p'$, which thus relieve the fastening devices $q$ of the lateral strain that would otherwise be exerted upon them. There is also of course a considerable upward pressure at the pivotal points of the brake when the brake is applied, and this thrust or pressure is directly resisted by the lower face of the fork crown. The strains tend to force outward the vertical sides of the trough-shaped bracket and this outward pressure is resisted by the vertical sides of the fork legs. Thus the bracket is reinforced at all points by the fork crown and fork legs, and may be of comparatively thin material and yet possess ample strength to resist the strains to which it is subjected. The brake $o$ may be readily and quickly detached from the vehicle after removing the fastening devices $q$ and when thus detached leaves no visible indication of its having been present in the machine, as the screw holes are out of sight on the under side of the fork crown. When this bracket is used on a machine having a mud guard for the front wheel, the same screws that hold the brake bracket may also hold the mud guard in place as will be readily understood. When the brake bracket is in place, it does not detract from the appearance of the machine as the holding bracket $p$ is almost entirely concealed beneath the fork crown.

The entire brake mechanism embodying my invention is of exceedingly light weight and simple construction.

The brake lever and bell-crank may be readily detached from the machine as will be readily understood and thus the brake and all its operating parts may be readily and quickly moved.

The adjustability of the lower connecting rod $l$, $m$, provides for varying the length of said rod in correspondence with the adjustment vertically of the handle bar.

Without limitation to the specific details of construction shown in the drawings, what I claim is—

1. In a brake mechanism the combination of a handle bar, two levers, a handle lever and a bell lever, both pivoted upon the handle bar and fitted to oscillate in planes substantially at right angles to each other, the handle lever being provided with a short angular extension or part at its inner end constituting the lug for the pivot pin whereby the said lever is offset from its pivotal point, and the bell lever being pivoted close to the pivot of the handle lever and having a short projection or bill which engages with said handle lever near the pivotal point thereof, a connecting rod joining said bell lever to a bell crank and connecting mechanism joining said bell crank to the brake, substantially as set forth.

2. In a velocipede the combination with a fork frame of a bracket fitting against the under side thereof and against the inner vertical sides thereof and detachably held thereto by fastening devices, and provided with fingers extending rearwardly over the fork legs, and a brake carried by said bracket, substantially as set forth.

3. In a brake mechanism the combination of the trough-shaped bracket $p$ having hooked fingers $p'$, $p'$, and fastening devices for securing the same to the frame of the vehicle, and the spoon brake $o$ pivoted upon said bracket, substantially as set forth.

4. In a brake mechanism the combination with a handle bar, of the brake lever $a$ mounted thereon, the lever $f$ also mounted thereon, said levers being pivoted so as to move in planes substantially at right angles to each other, and the lug $c$ on the brake lever $a$ engaging with the bill $d$ on the lever $f$, the connecting rod $g$, the bell-crank lever $h$ and the adjustable connecting rod $l$, $m$, the spoon brake $o$ having an arm $o'$ to which is connected the lower end of the adjustable connecting rod $l$, $m$, and the trough-shaped bracket $p$ having hooked fingers $p'$, $p'$ to which bracket the brake $o$ is pivoted, and fastening devices securing the said bracket to the frame of the vehicle, substantially as set forth.

This specification signed and witnessed this 27th day of March, A. D. 1894.

JAMES S. COPELAND.

In presence of—
 FELTON PARKER,
 ALVIN W. COMSTOCK.